United States Patent
Nara et al.

(10) Patent No.: US 10,303,568 B2
(45) Date of Patent: May 28, 2019

(54) SYSTEMS AND METHODS FOR HIGH AVAILABILITY OF MANAGEMENT CONTROLLERS

(71) Applicant: Dell Products L.P., Round Rock, TX (US)

(72) Inventors: Prakash Nara, Round Rock, TX (US); Sudhir Vittal Shetty, Cedar Park, TX (US); Balaji Shanmugam, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 147 days.

(21) Appl. No.: 15/429,718

(22) Filed: Feb. 10, 2017

(65) Prior Publication Data

US 2018/0232290 A1 Aug. 16, 2018

(51) Int. Cl.
*G06F 11/20* (2006.01)
*G06F 13/40* (2006.01)
*G06F 13/36* (2006.01)

(52) U.S. Cl.
CPC ...... *G06F 11/2028* (2013.01); *G06F 11/2033* (2013.01); *G06F 11/2038* (2013.01); *G06F 13/36* (2013.01); *G06F 13/4068* (2013.01)

(58) Field of Classification Search
CPC ............. G06F 11/2028; G06F 11/2033; G06F 11/2038; G06F 9/4403
See application file for complete search history.

(56) References Cited

U.S. PATENT DOCUMENTS

| | | | | |
|---|---|---|---|---|
| 2003/0188051 A1* | 10/2003 | Hawkins | ............. | G06F 11/2025 710/15 |
| 2008/0320117 A1* | 12/2008 | Johnsen | ................... | G06F 11/30 709/221 |
| 2009/0125752 A1* | 5/2009 | Chan | .................... | G06F 11/2025 714/3 |
| 2010/0146592 A1* | 6/2010 | Gamare | .............. | G06F 11/2025 726/4 |
| 2010/0180161 A1* | 7/2010 | Kern | .................... | G06F 11/2028 714/47.2 |
| 2013/0268714 A1* | 10/2013 | Brundridge | ............. | H04L 49/15 710/316 |
| 2014/0229758 A1* | 8/2014 | Richardson | ......... | G06F 11/3006 714/4.11 |
| 2015/0058659 A1* | 2/2015 | Brundridge | ......... | G06F 11/2025 714/4.11 |

* cited by examiner

*Primary Examiner* — Yolanda L Wilson
(74) *Attorney, Agent, or Firm* — Jackson Walker L.L.P.

(57) ABSTRACT

A chassis management controller may, responsive to initialization of the chassis management controller, execute cluster-aware services of the chassis management controller in a stand-by mode and communicate via a private management network fabric to determine if one or more other chassis management controllers are communicatively coupled to the private management network fabric. The chassis management controller may also, responsive to determining that one or more other chassis management controllers are communicatively coupled to the private management network fabric, alone or in concert with the one or more other chassis management controllers, elect an active chassis management controller from a plurality of chassis management controllers comprising the chassis management controller and the one or more other chassis management controllers.

12 Claims, 2 Drawing Sheets

SYSTEMS AND METHODS FOR HIGH AVAILABILITY OF MANAGEMENT CONTROLLERS

TECHNICAL FIELD

The present disclosure relates in general to information handling systems, and more particularly to providing high availability of chassis management controllers in a chassis configured to receive a plurality of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a chassis for housing multiple information handling systems, the chassis may include a plurality of redundant chassis management controllers in order to provide for high availability in the event of a failure of a single chassis management controller. However, configuring chassis management controllers for redundancy is a complex process.

Existing approaches to such configuration involves numerous sequences of manual steps which are prone to error.

SUMMARY

In accordance with the teachings of the present disclosure, certain disadvantages and problems associated with providing high availability of chassis management controllers have been reduced or eliminated.

In accordance with embodiments of the present disclosure, a chassis may include a plurality of slots for receiving modular information handling systems, a private management network fabric internal to the chassis and communicatively coupled to the plurality of slots, and a plurality of chassis management controllers communicatively coupled to the private management network fabric and configured to provide for out-of-band management of modular information handling systems received in the plurality of slots and information handling resources integral to the chassis. Each particular chassis management controller of the plurality of chassis management controllers may be further configured to: (a) responsive to initialization of the particular chassis management controller, execute cluster-aware services of the particular chassis management controller in a stand-by mode; (b) communicate via the private management network fabric to determine if one or more other chassis management controllers are communicatively coupled to the private management network fabric; and (c) responsive to determining that one or more other chassis management controllers are communicatively coupled to the private management network fabric, alone or in concert with the one or more other chassis management controllers, elect an active chassis management controller from the plurality of chassis management controllers, such that each of the plurality of chassis management controllers other than the active chassis management controller is a passive chassis management controller.

In accordance with these and other embodiments of the present disclosure, a chassis management controller configured to communicatively couple to a private management network fabric of a chassis and configured to provide for out-of-band management of modular information handling systems received in a plurality of slots and information handling resources integral to the chassis, may include a processor and a program of executable instructions embodied in computer readable media, and configured to, when read and executed by the processor: (a) responsive to initialization of the chassis management controller, execute cluster-aware services of the chassis management controller in a stand-by mode; (b) communicate via the private management network fabric to determine if one or more other chassis management controllers are communicatively coupled to the private management network fabric; and (c) responsive to determining that one or more other chassis management controllers are communicatively coupled to the private management network fabric, alone or in concert with the one or more other chassis management controllers, elect an active chassis management controller from a plurality of chassis management controllers comprising the chassis management controller and the one or more other chassis management controllers, such that each of the plurality of chassis management controllers other than the active chassis management controller is a passive chassis management controller.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, in a chassis management controller configured to communicatively couple to a private management network fabric of a chassis and configured to provide for out-of-band management of modular information handling systems received in the plurality of slots and information handling resources integral to the chassis: (a) responsive to initialization of the chassis management controller, execute cluster-aware services of the chassis management controller in a stand-by mode; (b) communicate via the private management network fabric to determine if one or more other chassis management controllers are communicatively coupled to the private management network fabric; and (c) responsive to determining that one or more other chassis management controllers are communicatively coupled to the private management network fabric, alone or in concert with the one or more other chassis management controllers, elect an active chassis management controller from a plurality of chassis management controllers comprising the chassis management controller and the one or more other chassis management controllers, such that each of the plurality of chassis management controllers other than the active chassis management controller is a passive chassis management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
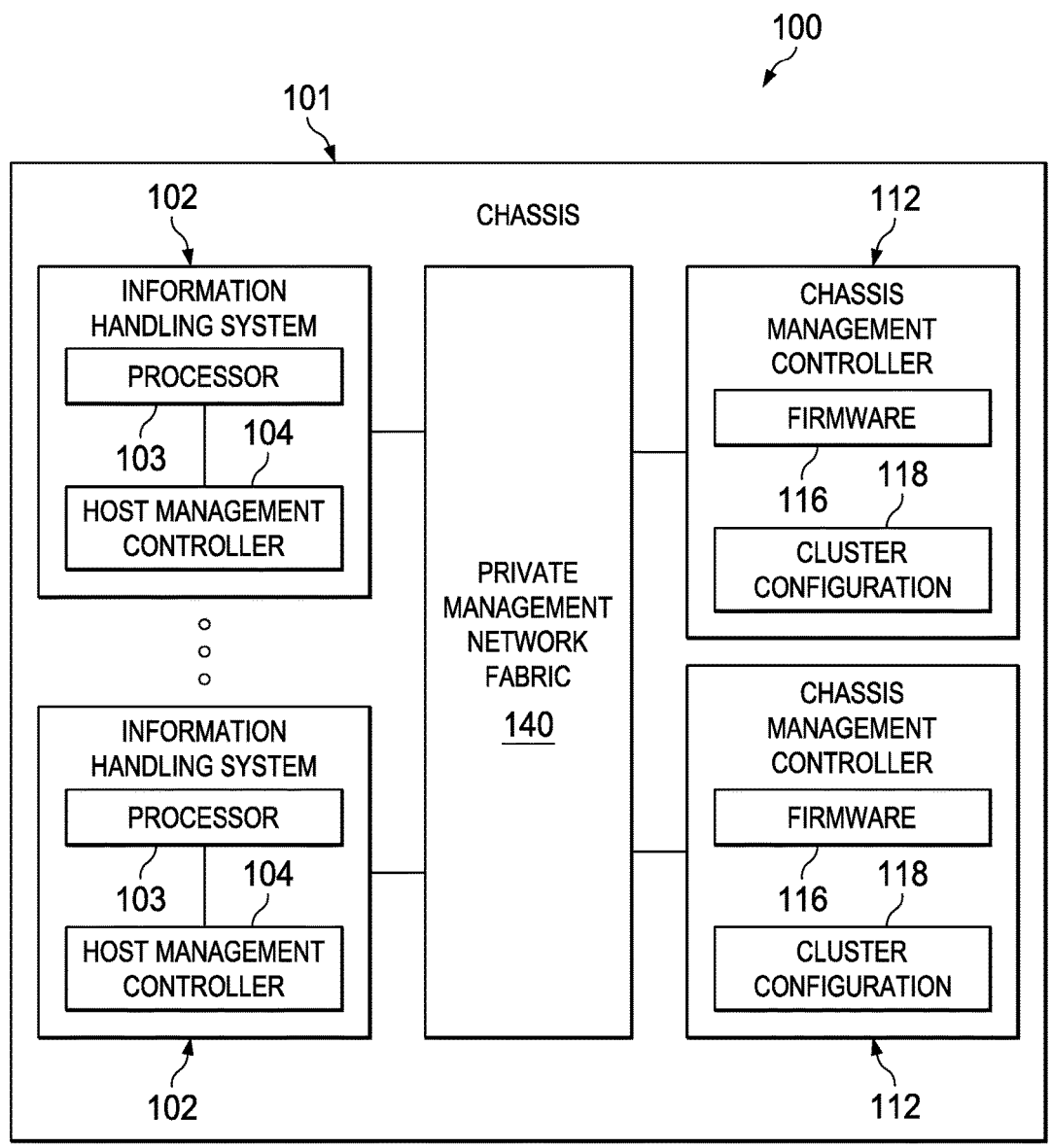
FIG. 1 illustrates a block diagram of an example system chassis with multiple modular information handling systems disposed therein, in accordance with embodiments of the present disclosure.
Figure 2:
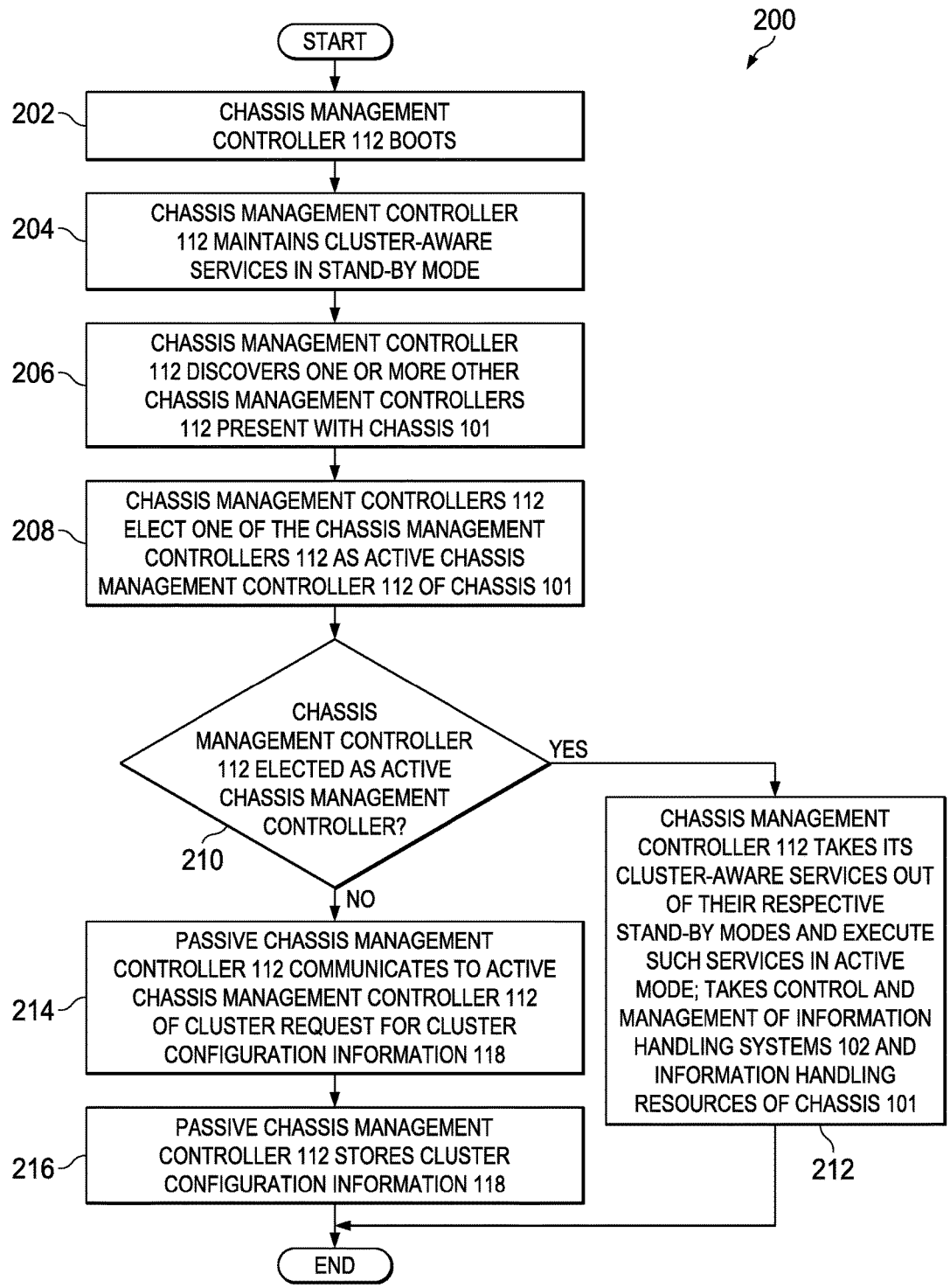
FIG. 2 illustrates a flow chart of an example method for providing high availability of chassis management controllers, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of an example system 100 comprising a chassis 101 with multiple modular information handling systems 102 disposed therein, in accordance with embodiments of the present disclosure. As depicted in FIG. 1, system 100 may comprise a chassis 101 including a plurality of information handling systems 102, a private management network fabric 140, and plurality of chassis management controllers 112. In addition to information handling systems 102, private management network fabric 140, and chassis management controller 112, chassis 101 may include one or more other information handling resources.

An information handling system 102 may generally be operable to receive data from and/or communicate data to one or more information handling resources of chassis 101, including communicating with chassis management controller 112 via private management network fabric 140. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and a host management controller 104. In addition to processor 103 and host management controller 104, information handling system 102 may include one or more other information handling resources.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory or other computer-readable media accessible to processor 103.

Information handling system 102 may include a host management controller 104. Host management controller 104 may be implemented by, for example, a microprocessor, microcontroller, DSP, ASIC, EEPROM, or any combination thereof. Host management controller 104 may be configured to communicate with chassis management controller 112. Such communication may be made, for example, via private management network fabric 140. Host management controller 104 may be configured to provide out-of-band management facilities for management of information handling system 102. Such management may be made by information handling resources of chassis 101 even if information handling system 102 is powered off or powered to a standby state. Host management controller 104 may include a processor, memory, and network connection separate from the rest of information handling system 102. In certain embodiments, host management controller 104 may include or may be an integral part of a baseboard management controller (BMC), Dell Remote Access Controller (DRAC) or an Integrated Dell Remote Access Controller (iDRAC).

A chassis management controller 112 may comprise any system, device, or apparatus configured to facilitate management and/or control of system 100 embodied by chassis 101, its information handling systems 102, and/or one or more of its component information handling resources. A chassis management controller 112 may be configured to issue commands and/or other signals to manage and/or control an information handling system 102 and/or information handling resources of system 100. Chassis management controller 112 may comprise a microprocessor, microcontroller, DSP, ASIC, field programmable gate array ("FPGA"), EEPROM, or any combination thereof. In some embodiments, a chassis management controller 112 may provide a management console for user/administrator access to these functions. For example, a chassis management controller 112 may implement Web Services Management ("WS-MAN") or another suitable management protocol permitting a user to remotely access a chassis management controller 112 to configure system 100 and its various information handling resources. In such embodiments, chassis management controller 112 may interface with a network interface, thus allowing for "out-of-band" control of system 100, such that communications to and from a chassis management controller 112 are communicated via a management channel physically isolated from an "in-band" communication channel of chassis 101 for which non-management communication may take place. Thus, for example, if a failure occurs in system 100 that prevents an administrator from interfacing with system 100 via the in-band communication channel or a user interface associated with chassis 101 (e.g., power failure, etc.), the administrator may still be able to monitor and/or manage system 100 (e.g., to diagnose problems that may have caused failure) via chassis management controller 112. In the same or alternative embodiments, chassis management controller 112 may allow an administrator to remotely manage one or more parameters associated with operation of system 100 and its various information handling resources (e.g., power usage, processor allocation, memory allocation, security privileges, etc.). In some embodiments, a chassis management controller 112 may include a management services module.

As shown in FIG. 1, each chassis management controller 112 may include firmware 116 and cluster configuration information 118. Firmware 116 may comprise a program of executable instructions configured to, when executed by a processor (e.g., a processor internal to chassis management controller 112), carry out the functionality of chassis management controller 112.

Cluster configuration information 118 may include a database, list, table, map, or other suitable data structure configured to set forth configuration information for chassis management controllers 112. Such configuration information may include any suitable information relating to the management and control by chassis management controllers 112 of information handling systems 102 and other information handling resources of chassis 100.

Private management network fabric 140 may comprise a network and/or fabric configured to couple information handling systems 102 (e.g., via host management controller 104) and chassis management controller 112 to each other and/or one or more other information handling resources of chassis 101. In these and other embodiments, private management network fabric 140 may include a communication infrastructure, which provides physical connections, and a management layer, which organizes the physical connections and information handling resources communicatively coupled to private management network fabric 140. Private management network fabric 140 may be implemented as, or may be a part of, an Ethernet local area network (LAN) or any other appropriate architecture or system that facilitates the communication of signals, data, and/or messages.

As can be seen in FIG. 1, the presence of a plurality of chassis management controllers 112 in chassis 101 may provide high availability of the management and control functions of chassis management controllers 112 in the event of a failure of one of chassis management controllers 112. In addition, as described in further detail herein, chassis management controllers 112 may be configured to perform automated formation of a cluster of chassis management controllers 112 and automated configuration and synchronization of configuration information. For example, on boot-up or other initialization of chassis management controllers 112, cluster-aware services (e.g., database service, task execution service, event processing service, monitoring service, web service, networking service, etc.) executing as part of firmware 116 on both of chassis management controllers 112 may execute in a stand-by mode, thus performing only essential tasks and not providing any management interfaces external to chassis management controllers 112. Shortly after boot/initialization, firmware 116 of each chassis management controller 112 may execute a multicast domain name service (mDNS) or similar service to automatically detect the existence of another chassis management controller 112 communicatively coupled to private management network fabric 140, thus indicating to such chassis management controller 112 the presence or absence of redundancy of chassis management controllers 112. After discovery of each other, chassis management controllers 112 may authenticate each other (e.g., using OAuth authentication) to establish trust with one another.

If redundancy of chassis management controllers 112 exists, firmware 116 of each chassis management controller 112 may provide for automatic election of which chassis management controller 112 is selected as the active chassis management controller 112. For example, firmware 116 may be configured such that the chassis management controller 112 that first claims a hardware control bus (e.g., a system management bus, Inter-Integrated Circuit bus, or another management bus) communicatively coupled to chassis management controllers 112 is elected as the active chassis management controller 112. After the active chassis management controller 112 is established, the active chassis management controller 112 may communicate cluster configuration information 118 to all passive chassis management controllers 112, and the active chassis management controller 112 may command all chassis management controllers 112 to assume their roles. Accordingly, all management services on the active chassis management controller 112 may transition to an active mode and provide management services via external interfaces (e.g., communications buses and network interfaces) of the active chassis management controller 112.

FIG. 2 illustrates a flow chart of an example method 200 for providing high availability of chassis management controllers, in accordance with embodiments of the present disclosure. According to some embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, a chassis management controller 112 may boot or otherwise initialize. At step 204, chassis management controller 112 may maintain cluster-aware services (e.g., database service, task execution service, event processing service, monitoring service, web service, networking service, etc.) in a stand-by mode. At step 206, chassis management controller 112 may discover (e.g., via an mDNS service communicating over private management network fabric 140) one or more other chassis management controllers 112 present within the same chassis 101, and may establish trust with such one or more other chassis management controllers 112 in any suitable manner for authenticating and establishing trust. For example, chassis management controllers 112 may establish trust using multi-policy OAuth authentication using appropriate symmetric keys and certificates.

At step 208, chassis management controller 112 may, alone or in concert with the one or more other chassis management controllers 112, elect one of the chassis management controllers 112 as the active chassis management controller 112 of chassis 101. Election of the active chassis management controller 112 may be conducted in any suitable manner. For example, in some embodiments, the chassis management controller 112 which is the first chassis management controller to take over a hardware control bus (e.g., a system management bus, Inter-Integrated Circuit bus, or another management bus) communicatively coupled to chassis management controllers 112 may be elected as the active chassis management controller 112.

At step 210, the chassis management controller 112 may determine whether it is elected as the active chassis management controller 112. If the chassis management controller 112 is elected as the active chassis management controller 112, method 200 may proceed to step 212. Otherwise, method 200 may proceed to step 214.

At step 212, responsive to the chassis management controller 112 being elected as the active chassis management controller 112, chassis management controller 112 may take its cluster-aware services out of their respective stand-by modes and execute such services in an active mode, thereby taking control and management of the information handling systems 102 and other information handling resources of chassis 101. While in such active mode, chassis management controller 112 may respond to requests by other chassis management controllers 112 for cluster configuration information 118. After completion of step 212, method 200 may end.

At step 214, responsive to the chassis management controller 112 being a passive controller (e.g., not being elected as the active chassis management controller 112), chassis management controller 112 may communicate to the active chassis management controller 112 of the cluster comprising the chassis management controllers 112 of chassis 101 a request for cluster configuration information 118 (e.g., provided that chassis management controller 112 has not already retrieved cluster configuration information 118). At step 216, chassis management controller 112 may store cluster configuration information 118, such that in the event of a failover to chassis management controller 112 from an active chassis management controller 112, chassis management controller 112 may have all cluster configuration information 118 needed to function as an active chassis management controller 112. After completion of step 216, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100, and/or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:
1. A chassis comprising:
   a plurality of slots for receiving modular information handling systems;
   a private management network fabric internal to the chassis and communicatively coupled to the plurality of slots; and
   a plurality of chassis management controllers communicatively coupled to the private management network fabric and configured to provide for out-of-band management of modular information handling systems received in the plurality of slots and information handling resources integral to the chassis, each particular chassis management controller of the plurality of chassis management controllers further configured to:
      responsive to initialization of the particular chassis management controller, execute cluster-aware services of the particular chassis management controller in a stand-by mode;
      communicate via the private management network fabric to determine if one or more other chassis man- agement controllers are communicatively coupled to the private management network fabric;

responsive to determining that one or more other chassis management controllers are communicatively coupled to the private management network fabric, alone or in concert with the one or more other chassis management controllers, elect an active chassis management controller from the plurality of chassis management controllers, such that each of the plurality of chassis management controllers other than the active chassis management controller is a passive chassis management controller; and responsive to being elected as the active chassis management controller:
  remove its cluster-aware services from the stand-by mode and execute the cluster-aware services in an active mode to form a cluster among the plurality of chassis management controllers; and
  control and manage the modular information handling systems and information handling resources of the chassis.

2. The chassis of claim 1, wherein the particular chassis management controller is further configured to, responsive to being elected as the active chassis management controller, communicate cluster configuration information to the one or more other chassis management controllers.

3. The chassis of Claim 1, wherein the particular chassis management controller is further configured to, responsive to being a passive chassis management controller:
  communicate a request to the active chassis management controller for cluster configuration information; and
  receive the cluster configuration information from the active chassis management controller.

4. The chassis of claim 3, wherein the particular chassis management controller is further configured to use the cluster configuration information to control and manage the modular information handling systems and information handling resources of the chassis responsive to a failure of the active chassis management controller.

5. A chassis management controller configured to communicatively couple to a private management network fabric of a chassis and configured to provide for out-of-band management of modular information handling systems received in a plurality of slots and information handling resources integral to the chassis, the chassis management controller comprising:
  a processor; and
  a program of executable instructions embodied in computer readable media, and configured to, when read and executed by the processor:
    responsive to initialization of the chassis management controller, execute cluster-aware services of the chassis management controller in a stand-by mode;
    communicate via the private management network fabric to determine if one or more other chassis management controllers are communicatively coupled to the private management network fabric;
    responsive to determining that one or more other chassis management controllers are communicatively coupled to the private management network fabric, alone or in concert with the one or more other chassis management controllers, elect an active chassis management controller from a plurality of chassis management controllers comprising the chassis management controller and the one or more other chassis management controllers, such that each of the plurality of chassis management controllers other than the active chassis management controller is a passive chassis management controller; and
    responsive to the chassis management controller being elected as the active chassis management controller:
      remove its cluster-aware services from the stand-by mode and execute the cluster-aware services in an active mode to form a cluster among the plurality of chassis management controllers; and
      control and manage the modular information handling systems and information handling resources of the chassis.

6. The chassis management controller of claim 5, wherein the chassis management controller is further configured to, responsive to being elected as the active chassis management controller, communicate cluster configuration information to the one or more other chassis management controllers.

7. The chassis management controller of Claim 5, wherein the chassis management controller is further configured to, responsive being a passive chassis management controller:
  communicate a request to the active chassis management controller for cluster configuration information; and
  receive the cluster configuration information from the active chassis management controller.

8. The chassis management controller of claim 7, wherein the chassis management controller is further configured to use the cluster configuration information to control and manage the modular information handling systems and information handling resources of the chassis responsive to a failure of the active chassis management controller.

9. An article of manufacture comprising:
  a non-transitory computer readable medium; and
  computer-executable instructions carried on the computer readable medium, the instructions readable by a processor, the instructions, when read and executed, for causing the processor to, in a chassis management controller configured to communicatively couple to a private management network fabric of a chassis and configured to provide for out-of-band management of modular information handling systems received in the plurality of slots and information handling resources integral to the chassis:
    responsive to initialization of the chassis management controller, execute cluster-aware services of the chassis management controller in a stand-by mode;
    communicate via the private management network fabric to determine if one or more other chassis management controllers are communicatively coupled to the private management network fabric;
    responsive to determining that one or more other chassis management controllers are communicatively coupled to the private management network fabric, alone or in concert with the one or more other chassis management controllers, elect an active chassis management controller from a plurality of chassis management controllers comprising the chassis management controller and the one or more other chassis management controllers, such that each of the plurality of chassis management controllers other than the active chassis management controller is a passive chassis management controller; and
    responsive to management controller being elected as the active chassis management controller:
      remove its cluster-aware services from the stand-by mode and execute the cluster-aware services in an active mode to form a cluster among the plurality of chassis management controllers; and control and manage the modular information handling systems and information handling resources of the chassis.

10. The article of claim 9, the instructions for further causing the processor to, responsive to management controller being elected as the active chassis management controller, communicate cluster configuration information to the one or more other chassis management controllers.

11. The article of Claim 9, the instructions for further causing the processor to, responsive to the management controller being a passive chassis management controller:
- communicate a request to the active chassis management controller for cluster configuration information; and
- receive the cluster configuration information from the active chassis management controller.

12. The article of claim 11, the instructions for further causing the processor to use the cluster configuration information to control and manage the modular information handling systems and information handling resources of the chassis responsive to a failure of the active chassis management controller.

* * * * *